United States Patent [19]

Tanaka et al.

[11] Patent Number: 4,737,783
[45] Date of Patent: Apr. 12, 1988

[54] EMERGENCY ACCESS METHOD IN CENTRALIZED MONITORING SYSTEM

[75] Inventors: Hidehiko Tanaka, Tenri; Masahiro Ise, Kashihara; Katsuyuki Machino, Nara; Toshiyuki Matsubara; Teiji Terasaka, both of Tenri; Takaaki Okamoto, Nara, all of Japan

[73] Assignee: Sharp Kabushiki Kaisha, Osaka, Japan

[21] Appl. No.: 496,395

[22] Filed: May 20, 1983

[30] Foreign Application Priority Data

May 20, 1982 [JP] Japan ................................. 57-86139

[51] Int. Cl.[4] .............................................. H04Q 1/00
[52] U.S. Cl. ........................... 340/825.5; 340/4825.51; 340/825.08
[58] Field of Search ....................... 340/825.05, 825.12, 340/825.5, 825.51, 825.08, 533; 370/86, 88, 94, 85, 96

[56] References Cited

U.S. PATENT DOCUMENTS

| | | | |
|---|---|---|---|
| 4,063,220 | 12/1977 | Metcalfe et al. | 340/825.5 |
| 4,161,786 | 7/1979 | Hopkins et al. | 370/94 |
| 4,340,961 | 7/1982 | Capel et al. | 370/96 |
| 4,379,294 | 4/1983 | Sutherland | 370/85 |
| 4,409,592 | 10/1983 | Hunt | 340/825.5 |

OTHER PUBLICATIONS

Weiss, L. "Randomizing Transmission Delays in a Closed-Ring Environment", IBM Technical Disclosure Bulletin, vol. 25, No. 10, Mar. 1983.

*Primary Examiner*—Ulysses Weldon
*Attorney, Agent, or Firm*—Birch, Stewart Kolasch & Birch

[57] ABSTRACT

The present disclosure is directed to an emergency access method in which in the event that an emergency data occurring at a particular terminal is fed immediately to a central system but collides with any emergency data from a different terminal such collision is sensed and a signal in that data is delayed in a random number manner through the use of an appropriate random number generating algorithm in order to avoid such collision within a short length of time.

6 Claims, 8 Drawing Sheets

FIG.4(A) CENTRAL SYSTEM

TERMINAL

FIG. 8(C) enlarged

noise equivalent to resource frequency

FIG. 10(B)

signal

filter output

FIG. 10(E)

digital counting only signal extracted

FIG. 13(A) — power line voltage

FIG. 13(B) — filter output, noise type ①, noise type ②

FIG. 13(C) — detection level L, filter output

FIG. 13(D) — level detector output, 1-3, 2-4, carrier interval

FIG. 13(E) — 10 → data "1", 01 → data "0"

EMERGENCY ACCESS METHOD IN CENTRALIZED MONITORING SYSTEM

BACKGROUND OF THE INVENTION

This invention relates to an emergency access method in a centralized monitoring system utilizing power supply wiring which enables the system to respond quickly to an emergency situation such as fire, leakage of gas and burglary.

As is well known in the art, data transmission over power supply wiring is usually carried out in sychronism with the utility power frequency since there are various kinds of noise traveling over the power supply wiring and in synchronism with the utility power frequency. Such transmission is slow because each of the data bits is assigned to each of the power supply frequency cycles. Coaxial cable or wireless transmission, each of which involve a rather complex procedure to achieve improvement of reliability, have not been available.

Figure 1:
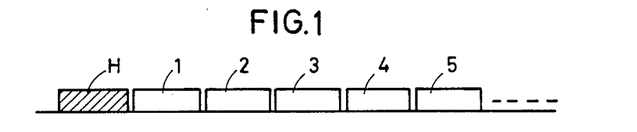
FIG. 1 is a timing chart showing the conventional time-sharing fixed assignment method.
Figure 2:
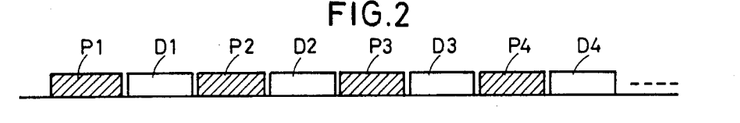
FIG. 2 is a timing chart showing the conventional polling method.

Two simpler methods are the time-sharing fixed assignment method or the polling method as shown in FIGS. 1 and 2. The time-sharing fixed assignment method, as shown in FIG. 1, permits each of the terminals to transmit data 1–5 in its own time slot after the recognition of a specific code H (referred to as "header") from a central system. The polling method, as shown in FIG. 2, permits only one terminal, selected by address signals (polling signals) $P_1$, $P_2$, $P_3$ and so forth, to transmit data $D_1$, $D_2$, $D_3$ and so forth. Both of the conventional methods however suffer from the problem that it takes a substantial amount of time for the central system to collect all of the data when there are more than several tens of the terminals installed. The most serious problem is that the system is unable to respond quickly to any emergency request included in the data being transmitted.

OBJECT AND SUMMARY OF THE INVENTION

Accordingly, it is an object of the present invention to provide an emergency access method which deals with the occurrence of an emergency demand as discussed above.

Briefly speaking, the present invention achieves the above object by providing an emergency access method in which in the event that emergency data occurring at a particular terminal are fed immediately to a central system, but collide with any emergency data from a different terminal such collision is sensed and a signal in that data is delayed in a random number manner through the use of an appropriate random number generating algorithm in order to avoid such collision within a short length of time. Even if the terminals increase in number, the present method assures collection of any emergency data within the shortest period of time.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 3:
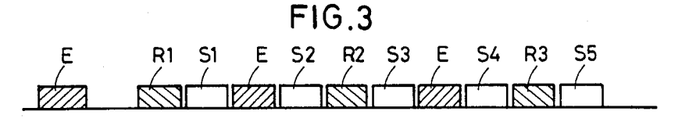
FIG. 3 is a timing chart showing control operation according to an embodiment of the present invention.
Figure 4:
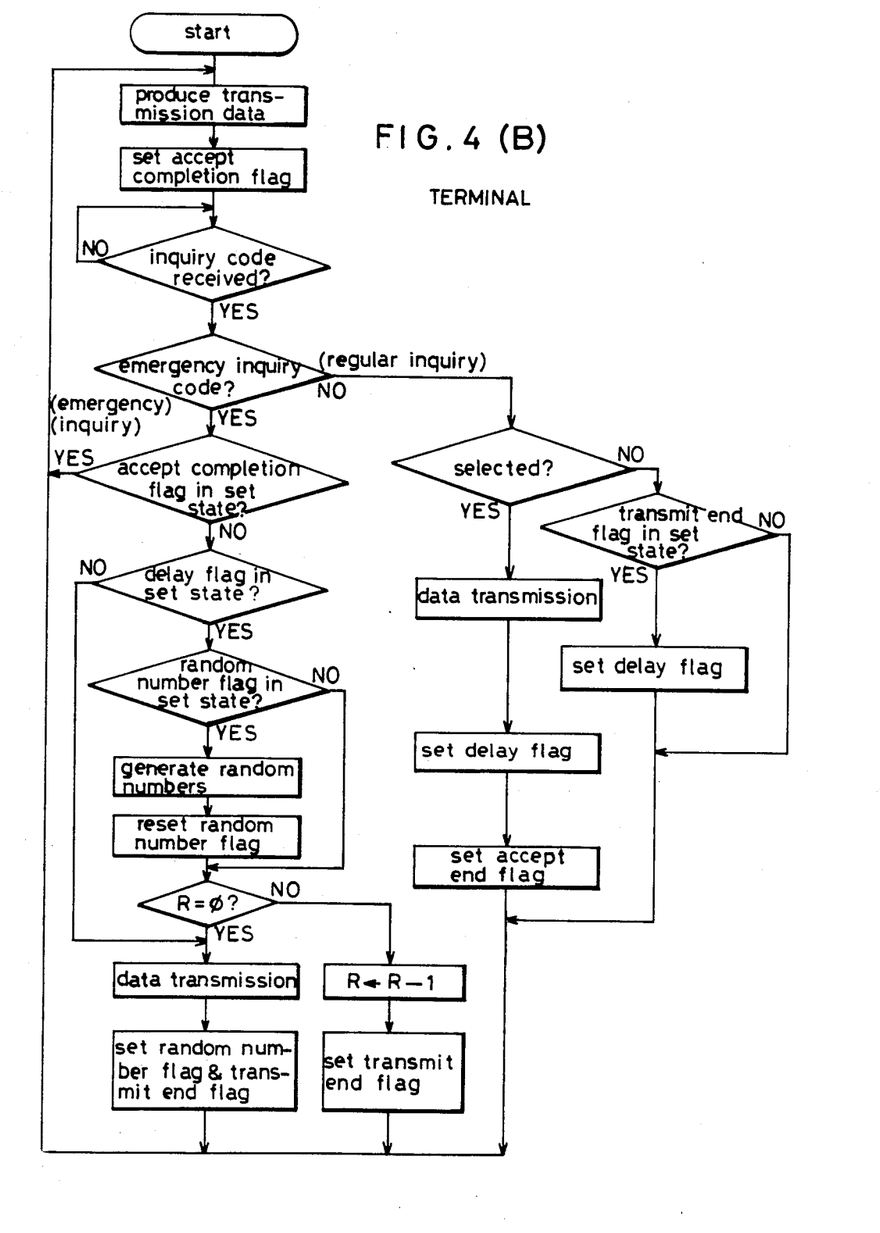
FIG. 4a and FIG. 4b are flow charts describing the control operation.
Figure 4A:
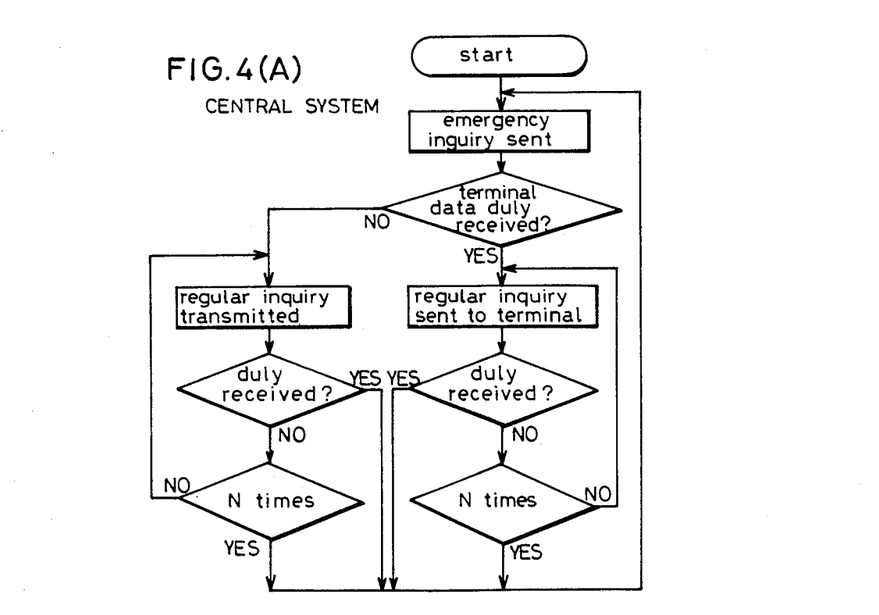

FIG. 3 is a timing chart showing an emergency access method according to the present invention, FIG. 4(A) is a flow chart describing control procedures carried out by a central system, and FIG. 4(B) is a flow chart describing control procedures in terminals. The central system as depicted in FIG. 3 transmits alternatively emergency inquiry codes E and regular inquiry codes $R_1$, $R_2$ and so forth. The regular inquiry codes $R_1$, $R_2$ and so forth are polling signals having address information for the respective terminals and are normally incremented or decremented each time data $S_1$, $S_2$, $S_3$ and so forth form a respective one of the terminals is duly received. It may be desirable that the data be re-transmitted a predetermined number of times in case of inadvertent failure to receive those data. As long as the present method described so far relies upon nothing else than these codes, it faces the same problem that the conventional method does in that an increased number of the terminals are required and it takes a long time to collect the data from all of the terminals largely because only the selected one of the terminals is allowed to transmit data. However, provided that an emergency code E is used to call for emergency data $S_2$, $S_4$ for all of the terminals, only the terminal or terminals whose data have not been accepted by the central system yet (that is, its acceptance completion flag has not been set yet) can transmit that data to the central system immediately upon receipt of the emergency code. When the control system receives the data correctly, the central system on one hand sends the polling signal to that terminal as the succeeding regular inquiry code $R_1$, $R_2$, $R_3$ and so forth and the terminal on the other hand re-transmits the same regular reply data to the central system. With regard to the emergency data $S_2$, $S_4$ once accepted by the central system, the acceptance completion flag is set not to respond to the succeeding emergency inquiry codes E as long as the emergency data $S_2$, $S_4$ remain unchanged in content.

When more than one terminal sends the emergency data $S_2$, $S_4$ concurrently in the above system, the data $S_2$, $S_4$ come into collision with each other. To restore the system from such collision, the method according to the present invention adopts the concept of random delay. In other words, subsequent to transmission of the emergency data $S_2$, $S_4$ a particular terminal which does not receive its own regular inquiry code $R_1$, $R_2$, $R_3$ and so forth (i.e., the data from that terminal has not been received duly by the central system due to collision with data from any other terminal or the like and thus other regular inquiry codes $R_1$, $R_2$, $R_3$ are transmitted for selection of other terminals) places its delay flag into set state and generates random numbers upon receipt of the succeeding emergency code E. Transmission of the emergency data $S_2$, $S_4$ is carried out after being postponed by the number of the resulting random numbers. Data collision among more than one terminal is eliminated through repetition of the above procedure.

The results of computer simulation reveal that the averaged time for restoration from collision may be shortened by using an appropriate random number generating algorithm that is a function of the individual addresses for the respective terminals, provided that the number of the collision terminals is not great.

As shown in FIG. 4(A) the central system operates to alternately produce emergency inquiries and regular inquiries.

FIG. 4(B) is a flowchart that shows how a terminal responds to the control procedures of the central system. The terminal produces transmission data and then sets an accept completion flag and then waits for an inquiry code to be received.

Once an inquiry code is received the device determines whether it is an emergency inquiry code or a regular inquiry.

When an emergency inquiry code is received, if the accept completion flag is set, the terminal cannot transmit data immediately. However if the accept completion flag is not set then emergency data can be transmitted in accordance with the collision compensation scheme.

If a regular code is received, the terminal determines if it has been selected, if so then it can transmit, if not then it does not transmit data.

Detection of data collision can be achieved readily by a coding method as fully described below.

Figure 6:
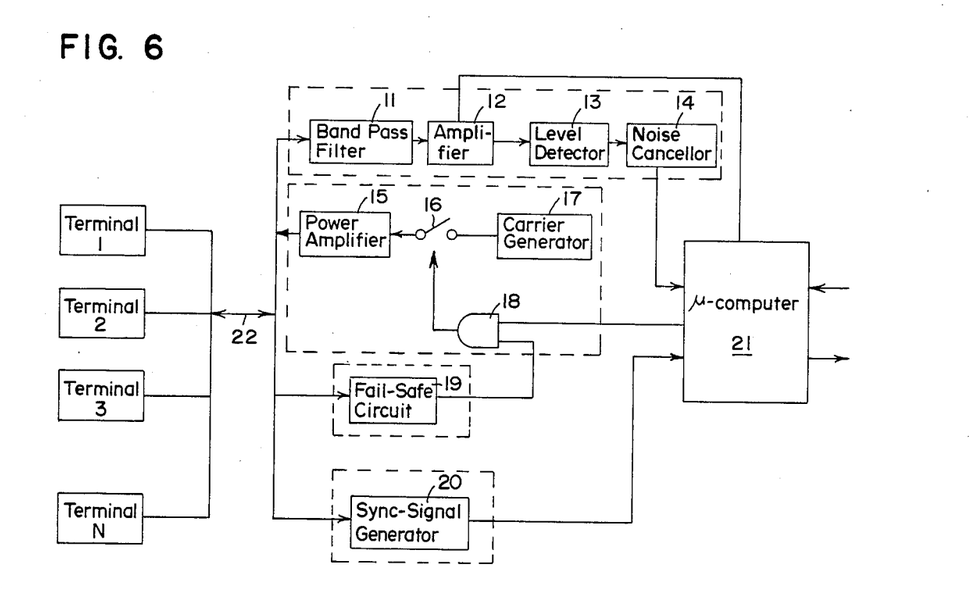
FIG. 6 is a block diagram of a signal transmission system which is used with the present method.

Referring now to FIG. 6, there is illustrated the whole of a signal transmission system over house wiring which generally includes a band pass filter 11, an amplifier 12, a level detector 13, a noise canceler 14, a power amplifier 15, a switch 16, a carrier generator 17, a logic gate 18, a fail-safe circuit 19, a sync signal extractor 20 and a controller 21 typically set up of a one-chip microcomputer. A plurality of additional terminals, also attached to house wiring 22 in this system, are denoted as terminal 1 to terminal N, with each terminal having the same characteristics as the detailed terminal illustrated in the figure. With such arrangement, house wiring 22 carries the utility power voltage, typically 60 Hz and 100 volts, and a carrier of typically 40 KHz superimposed on the utility power voltage. Obviously, the carrier is generated by the carrier generator 17. The band pass filter 11 extracts high frequency components from the house wiring 22 and the amplifier 12 amplifies the high frequency components up to a sufficient level suitable for satisfactory working of the level detector 13. The noise canceler 14 plays an important role in the present invention by removing any random noise from the high frequency components. Received data from the noise canceler 14 is fed to the controller 21 which is also responsive to an input from a sensor or enabled actuator. The fail-safe circuit 19 monitors to see if the controller 21 falls into run-away state. Under the normal state of the whole system, transmitted data is fed via the logic gate 18 and the switch 16 to the power amplifier 15. The sync extractor 20 converts the sine-waveform of the power line voltage waveform into a square wave.

Figure 8A:
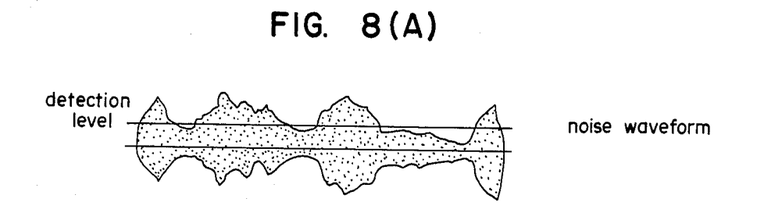
FIGS. 8(a) to 8(c), 9(a), 9(b), and 10(a) to 10(e) are noise waveforms of noise signals passing through the circuit system of FIG. 6.
Figure 8B:
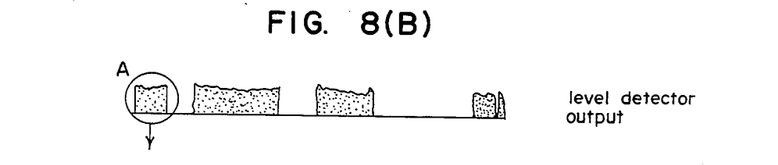
Figure 8C:
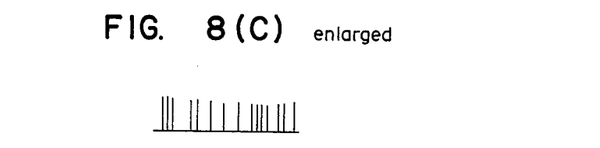
Figure 9A:
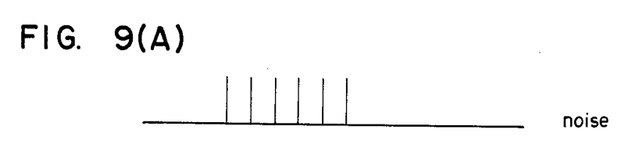
Figure 9B:
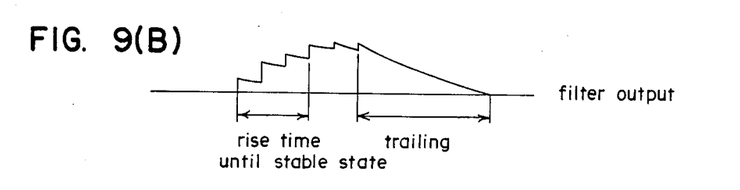

In the case where random noise with a level higher than a predetermined level is present after signals are passed through a resonance circuit for signal detection, it is impossible to decide merely from level detection whether the signals are true or appropriate. See FIGS. 8(a), 8(b), and 8(c) where FIG. 8(a) indicates the waveform of noise passing through the resonance circuit 11, FIG. 8(b) indicates the output of the level detector 13 and FIG. 8(c) indicates an enlargement of section A in FIG. 8(b). It is noted that the resonance circuit is used for setup of the band pass filter 11. As is clear from FIG. 8(c), the possibility that noise occurs continuously or lasts for a long time is very rare. Since only resonance frequency components are extracted from original noise through operation of the resonance circuit 11, the resultant waveform bears a form that is AM modulated at random at the resonance frequency. The time where signals last can be evaluated from the count of the continuous pulses corresponding to the resonance frequency which exceeds a detection level. Provided that the noise reduction procedure of monitoring of signal continuity is carried out with a known analog method (using a low-pass filter or an integrator), selection of its cut-off frequency is rather difficult and response characteristics become worse. For the convenience of illustrating level fluctuations only, the result from intervention of the low-pass filter on the output of the level detector is given in FIG. 9(b), suggesting that, with decrease of the cut-off frequency (1/time constant in case of the integrator), noise components are suppressed but rise time until normal state and trailing time become longer. Therefore, if the signals in question appear in the region where the rate of noise component is high compared with signal, effective removal of noise cannot be expected. In such a case, the impact of noise can be effectively eliminated by counting the number of pulses in digital fashion and disregarding the pulses in question if the count is less than a predetermined reference value.

Figure 10A:
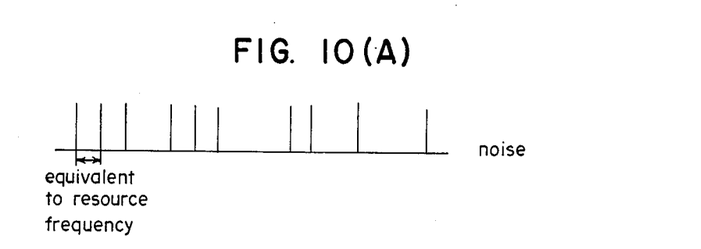
Figure 10B:
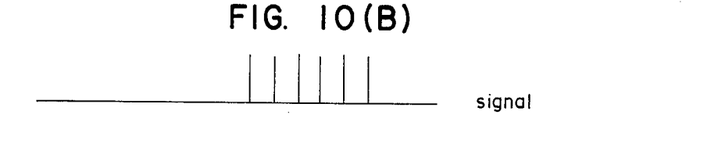
Figure 10C:
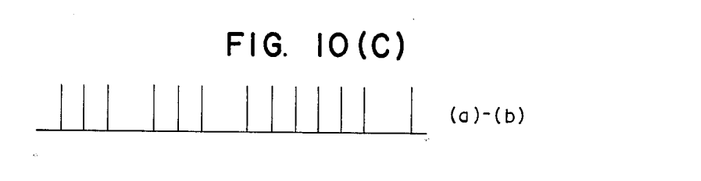
Figure 10D:
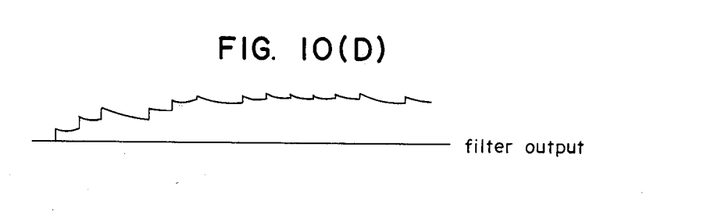
Figure 10E:
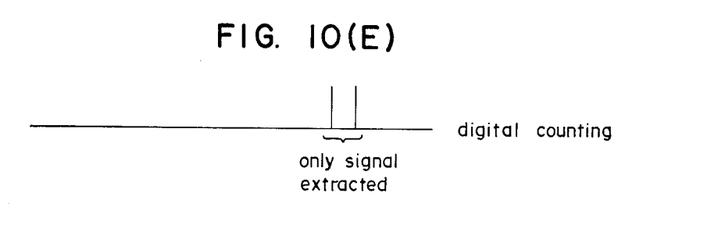

Assuming less than three continuous noise pulses and six signal pulses are present as indicated in FIG. 10(a) and 10 (b) (and 10 (c)), comparison between FIG. 10(d) showing the effect of the low-pass filter and FIG. 10(e) showing that of the digital processing proves the superiority of the latter. We assume that in this case the resonance frequency agrees with the signal frequency. In other words, the pulses after passing over the low-pass filter are given in FIG. 10(d), which face the difficulties in setting a proper detection level and extracting only signal components in an effective manner. The digital counting method as indicated in FIG. 10(e), on the other hand, serves to accept the pulses in question as effective or true signals when more than five pulses appear in continuous fashion, thus ensuring precise extraction of the effective signal components only.

Figure 11:
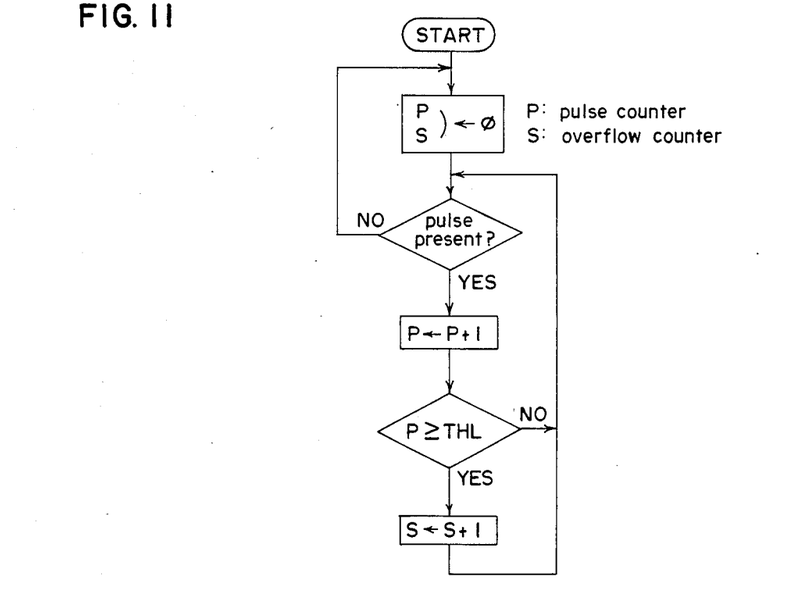
FIG. 11 is a flow chart of a noise threshold processing algorithm.

A processing algorithm of the present invention is depicted in a flow chart of FIG. 11 wherein a pulse counter is denoted by P and an overflow counter for counting pulses exceeding a setting is denoted by S. These counters are reset to zero immediately after pulses disappear at any sampling interval. The pulses present at the sampling intervals are subject to addition and whether the sum of the pulses is more than a predetermined threshold setting THL is then decided. Unless the threshold level THL is reached, the system decides if any pulses are present at the interval of sampling. If this step reveals that no pulses are present at the interval of sampling as before, then the counters P and S are reset to zero, bringing the whole system to its initial state. Should any succeeding pulses be present and the sum of counts exceed the threshold setting THL, the counter S is incremented, with its count treated as those indicative of signal components. Thereafter, the system returns to the primary step of deciding if any pulses are present at the interval of sampling and repeats the same procedure as mentioned above.

It is obvious from the foregoing that, if the threshold level or monitor time is selected to be longer than the length of time where impulse noise usually lasts, the effect of noise removal is further improved.

Figure 12:
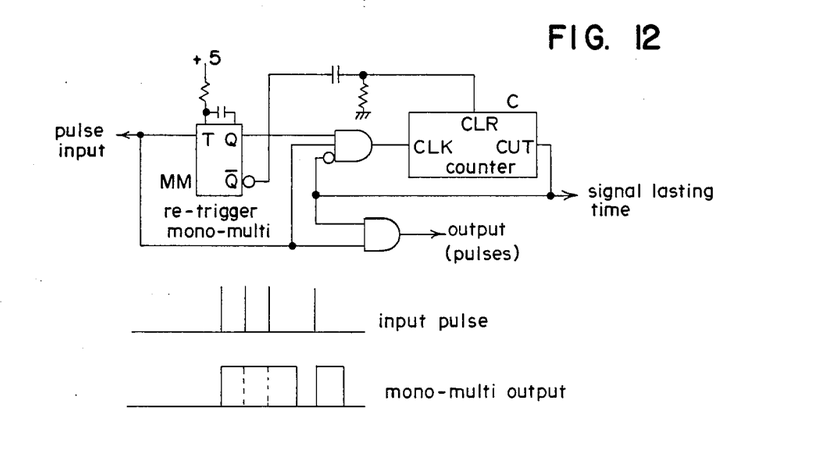
FIG. 12 is a schematic diagram of a random logic circuit for implementing the flow chart of FIG. 11.

The algorithm as indicated in FIG. 11 is implemented with a known microcomputer as long as its arithmetic speed is high. That is, it is impossible to do so if the signal frequency is higher than 10 KHz. In such a case, this process is achieved by a random logic scheme an example of which is given in FIG. 12. The step of sampling to decide if any pulses are present at the interval of signals is achieved when a retriggerable type monostable multivibrator MM of FIG. 12 has a time constant $_M$ longer than the signal interval $T_s$ but shorter than the twice signal interval (i.e., $T_s \, _m \, 2T_s$). Once the threshold counting has been reached, the counter C does not vary in count until the output of the retriggerable monostable multivibrator. Therefore, the output of this counter implies the signal duration. When measurement of the signal duration is undertaken by the microcomputer, it is more preferable that its internal counter be used to count the carriers and the output of the counter and the input pulses be AND' gated.

Figure 13A:
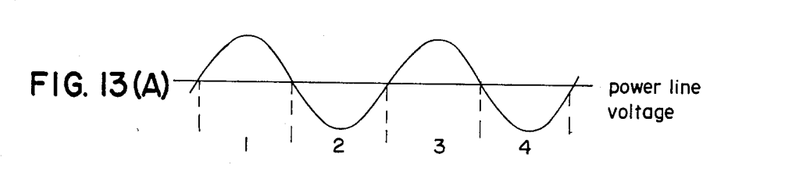
FIGS. 13(a) to 13(g) are time charts of noise signals synchronous with power line voltage appearing at various points in the system of FIG. 6.
Figure 13B:
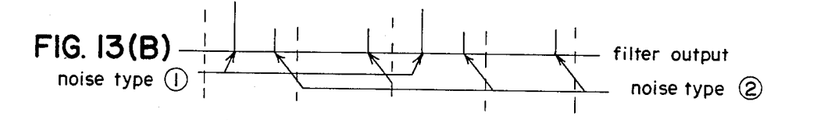
Figure 13C:
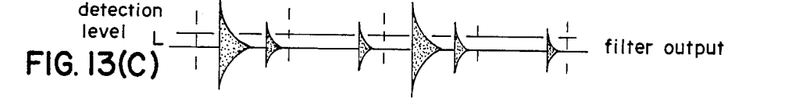

The noise reduction scheme is not effective in reducing the so-called thyristor noise which often occurs in the signal transmission system over building or house wiring in synchronism with the utility power frequency (for instance, 50 or 60 Hz). An additional technique is therefore required to fulfill the demand for perfect reduction of noise. Observation of voltages running through the house wiring and the hi-pass filter indicates that, as indicated in FIG. 13(b), there is included an impulsive noise of a high level (max: about 20 volts) and a short duration of about 5 s synchronous with the utility power voltage in FIG. 13(a). This synchronous noise is generally classified into two groups: (1) noise occurring in the same phase at one cycle of the power frequency and (2) that occurring twice whose phase difference is 180° in one cycle of the power frequency, while the former is rare and the latter is common. In the event that pulses in question are conveyed through a filter tuned to the carrier frequency, it is possible that impulse noise may excite the resonance circuit and give rise to dampened oscillation at the carrier frequency as viewed in FIG. 13(c). In case of AM transmission, the decision as to whether true signals are present or not is based upon whether there is any signal whose level exceeds an appropriate detection level. Should the detection level be set at L in FIG. 13(b), the output of the level detector is given in FIG. 13(d). Pursuant to the teachings of the present invention, taking notice of the definite fact that such noise is inavoidable, the decision as to whether true signals are available is made dependent upon the length of the time where signal components ccorresponding to the carriers during the half or full cycle of the power frequency last in succession. Another factor which should be considered in assuring highly reliable transmission of signals is difficulties in removing the impact of impulse noise even if the output of the level detector is filtered through the low-pass filter where the density of impulsive noises is substantially higher.

In the digital subtraction method embodying the present invention, noise/signal discrimination may be carried out in any interval of time (for instance, less than the half cycle of the power frequency). To cope with the first type of noise (1) which occurs every full cycle, 2-bit binary data "10" or "01" are superimposed on the carriers during the corresponding half cycles in two consecutive full-cycles (for instance, the first and third half cycles or the second and fourth half cycles) for signal transmission. During reception of signals, pulses in question are regarded as "signal" when the difference between the counts of the carriers during each of the half-cycles is larger than a reference setting and otherwise regarded as "noise". It is already noticed that data "10" and "01" may represent binary bit "0" or "1". The word "half-cycle" is used herein to define an interval beginning with 0° and ending with 380°, whether its phase is positive or negative. The full cycle, on the other hand, implies an interval beginning with 0° and ending with 360°.

Figure 13D:
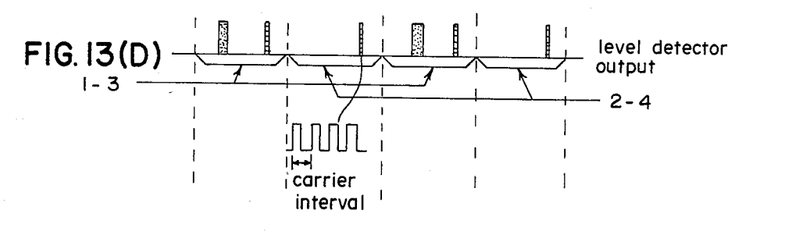
Figure 13E:
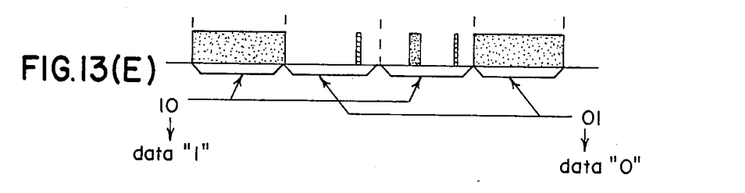
Figure 13F:
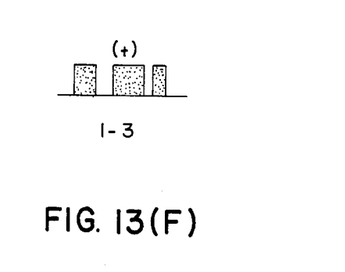
Figure 13G:
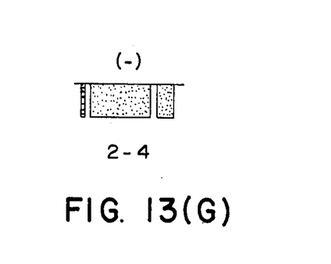

The subtraction or down-counting is executed between the preceding half-cycle and the succeeding half-cycle and the resulting difference is zero when only noise as shown in FIG. 13(d) is present. As a matter of fact, the above mentioned situation is however very rare but the situation where the differential count is less than the reference setting is treated in the same manner. However, when signals are transmitted in terms of "01" and "10" and the output of the level detector as in FIG. 13(e) is derived, the subtractions give its results as depicted in FIGS. 13(f) and 13(g) where the data signals are definitely distinguishable from noise. It is understood that FIG. 13(f) schematically shows the subtractin between the first and third half-cycles and FIG. 13(g) shows that between the second and fourth half-cycles.

Figure 7:
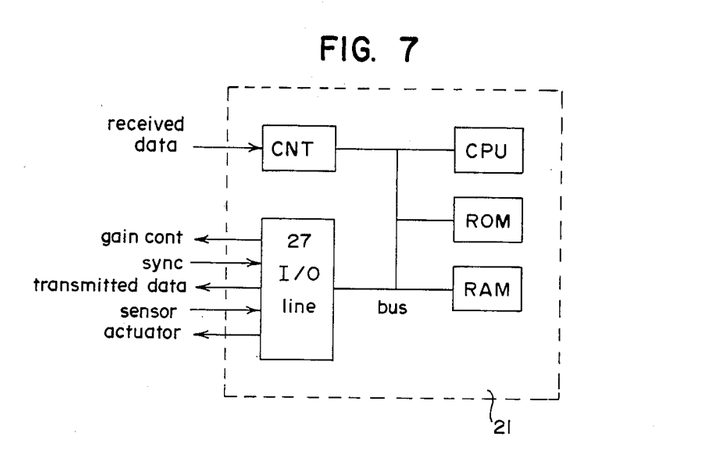
FIG. 7 is a detailed schematic diagram of microcomputer 21 of FIG. 6.
Figure 14:
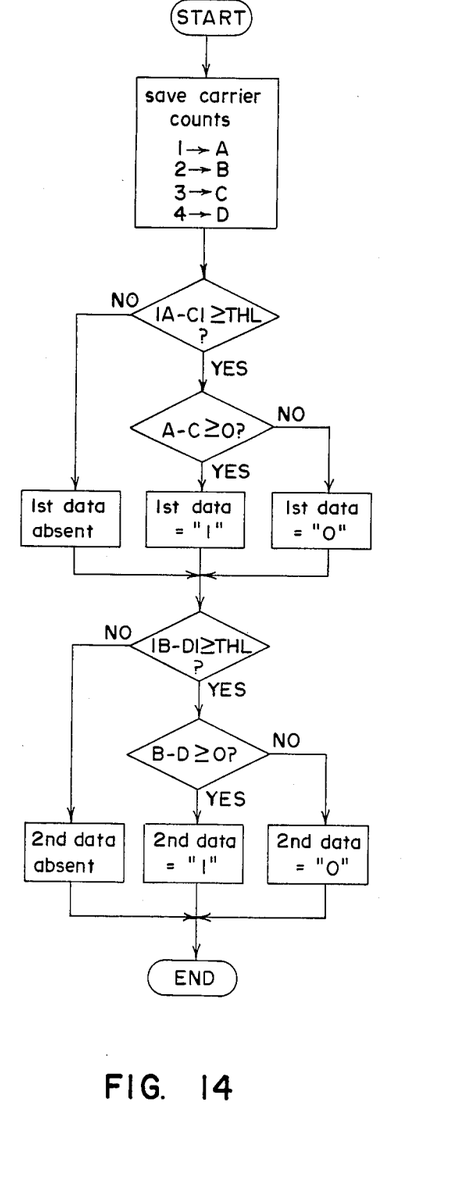
FIG. 14 is a flow chart of an algorithm for discriminating between data and noise.

The data/noise discrimination is detailed in a flow chart of FIG. 14. The counts of the carriers during the respective half-cycles within the two consecutive full cycles are saved in memory locations A to D. The carrier count during the first half-cycle is saved in the memory location A, that during the second half-cycle in the memory location B, that during the third half-cycle in the memory location C and during the fourth half-cycle in the memory location D. It is noted that this count operation is carried out using its built-in 8-bit counter of the microcomputer 21 in FIG. 7 which further includes an 8-bit CPU, a 1-K byte ROM, 64-byte RAM and 27 I/O lines as best shown in FIG. 8. A step is effected to decide if the differential count ( A–C ) between the first and third half-cycles A and C is greater than the threshold setting THL. If the setting is not exceeded, then the pulses in question are treated as "noise". In other words, the pulses in question are first treated as being not "signal" and excluded from an operating sequence of signal decision. As long as the threshold setting is exceeded and the result of the subtraction (A–C) is positive, the first data are regarded as "1". If the difference is negative, then the first data are considered as "0". Subsequently, the differential count (B-D) between the second and fourth half-cycles is evaluated and the second bit of data is considered as "1" or "0", based upon whether the sign of the differential count is plus or minus.

Referring to FIG. 13(e) the pulses in question during the first and third half-cycles A and C are characteristic of "10" and regarded as data "1", whereas those during the second and fourth half-cycles B and D are characteristic of "01" and regarded as data "0".

Since synchronous noise occurs mostly in a unit of the half-cycles of the power frequency as described briefly above, all that is necessary is to pay attention to only the first and second half-cycles and evaluate the differential count (A-B). This results in a simplified signal/noise decision algorithm. While in the foregoing the signal/noise decision relies upon the difference in the carrier counts, it is also possible to achieve such decision with the difference in lengths of time during the respective half-cycles where carrier frequency components last in succession.

Figure 5:
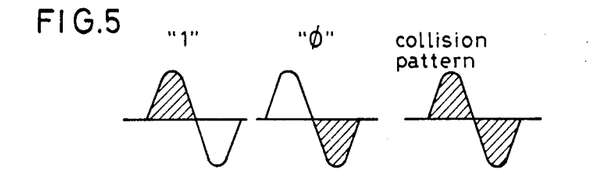
FIG. 5 is a waveform chart showing carrier signals carrying data superimposed during each cycle of the utility power supply voltage.

In FIG. 5, data "1" is defined by the pattern where a carrier is present during the first half of the utility power supply frequency but not during the second half thereof and data "φ" is defined by that where such a carrier is present during the second half and not during the first. This implies that there is necessarily the difference of at least one bit among data from the individual terminals. In the event of a collision, there is developed the abnormal pattern, similar to the noise discrimination by means of coding described above where a carrier is present during both the first and second halves and it is therefore possible to find collision upon the occurrence of such abnormal pattern.

The invention thus being described, it will be obvious that the same may be varied in many ways. Such variations are not to be regarded as a departure from the spirit and scope of the invention, and all such modifications are intended to be included within the scope of the following claims.

What is claimed is:

1. In a centralized monitoring system including a central system and a plurality of terminals and indoor power supply wiring connected as a data transmission path between said central system and said terminals, an emergency access means comprising:
    data request means for enabling said central system to call for data from said terminals, said data request means including means for permitting said central system to transmit emergency inquiry codes to all of said terminals as well as regular inquiry codes that are polling signals having address information for each of said terminals;
    data transmission means for transmitting data from said terminals to the central system in response to the data request means, said data including data from a terminal that is polled by a proper regular inquiry code as well as emergency data from a terminal in response to the transmission of an emergency inquiry code, which terminal has not yet received an acceptance signal from said central system indicating that a given emergency data from said terminal has previously been accepted by said central system; and
    means for sensing collisions of emergency data sent immediately upon occurrence of an emergency condition from a particular one of said terminals to said central system with other emergency data from different terminals, the existence of a collision being determined by the absence of an acceptance signal, the collision sensing means permitting said data request means to continue to transmit an emergency inquiry code as well as said polling signals;
    said terminals including means for delaying the transmission of said emergency data with random delay times and then re-transmitting said emergency data in response to the sensing of a collision by said collision sensing means.

2. The emergency access means of claim 1 wherein the delaying means includes a delay flag for generating random numbers for postponing re-transmission of the emergency data, upon receipt of said emergency inquiry code.

3. The emergency access means of claim 2 wherein said delay flag generates said random numbers through the use of an appropriate random number generating algorithm that is a function of the individual address of the respective terminals.

4. A method for controlling data flow in a centralized monitoring system having a plurality of terminals, each terminal having an individual address, and a shared monitor, comprising the steps of:
    polling the plurality of terminals by means of a plurality of polling signals produced by the monitor, each of said plurality of polling signals corresponding to one individual address of the plurality of terminals, with each of the plurality of terminals being polled once during a polling cycle;
    providing an emergency data access slot between each successive polling signal of a polling cycle, said emergency data access slot permitting at least one of the plurality of terminals which has not yet been polled during said polling cycle to transmit emergency data to the central monitor;
    sensing a collision of emergency data transmitted by at least two of the plurality of terminals during one emergency data access slot;
    delaying retransmission of each emergency data that has been involved in a collision of emergency data with random time delays produced at each of said plurality of terminals, the delay of the retransmission avoiding subsequent collisions of each of the emergency data involved in a first collision.

5. The method of claim 4, wherein the step of delaying retransmission includes generating random numbers for random time delays with a delay flag.

6. The method of claim 5, wherein said step of generating random numbers is carried out in accordance with a random number generating algorithm, said algorithm being a function of the individual addresses of the plurality of terminals.

* * * * *